United States Patent
Petri et al.

(10) Patent No.: US 6,676,504 B2
(45) Date of Patent: Jan. 13, 2004

(54) CONTROLLER, CABIN PRESSURE CONTROL SYSTEM AND METHOD OF CONTROLLING CABIN PRESSURE

(75) Inventors: Bernhard Petri, Mainz-Kastel (DE); Christian Felsch, Maintal (DE); Veit Albrecht, Heusenstamm (DE); Lars Runkel, Freiburg (DE)

(73) Assignee: Nord-Micro AG & Co. oHG, Frankfurt am Main (DE)

( * ) Notice: Subject to any disclaimer, the term of this patent is extended or adjusted under 35 U.S.C. 154(b) by 133 days.

(21) Appl. No.: 10/088,925

(22) PCT Filed: Jul. 18, 2001

(86) PCT No.: PCT/EP01/08329
§ 371 (c)(1),
(2), (4) Date: Mar. 20, 2002

(87) PCT Pub. No.: WO02/08056
PCT Pub. Date: Jan. 31, 2002

(65) Prior Publication Data
US 2002/0173263 A1 Nov. 21, 2002

(30) Foreign Application Priority Data

Jul. 20, 2000 (EP) .............................. 00115674
Aug. 1, 2000 (EP) .............................. 00116598

(51) Int. Cl.$^7$ ............................................... B64D 13/04
(52) U.S. Cl. ........................................ 454/72; 454/74
(58) Field of Search .................................. 454/72, 74

(56) References Cited

U.S. PATENT DOCUMENTS

| | | | |
|---|---|---|---|
| 3,053,162 A | * | 9/1962 | Andresen, Jr. ............... 454/72 |
| 3,434,407 A | * | 3/1969 | Best .............................. 454/72 |
| 4,164,897 A | * | 8/1979 | Aldrich et al. ................. 454/72 |
| 4,164,899 A | * | 8/1979 | Burgess ........................ 454/72 |
| 4,164,900 A | * | 8/1979 | Aldrich ......................... 454/72 |
| 4,553,474 A | * | 11/1985 | Wong et al. ................... 454/74 |
| 5,520,578 A | * | 5/1996 | Bloch et al. ................... 454/74 |

FOREIGN PATENT DOCUMENTS

EP 0 625 463 * 11/1994

* cited by examiner

Primary Examiner—Harold Joyce
(74) Attorney, Agent, or Firm—Stephen B. Salai, Esq.; Brian B. Shaw, Esq.; Harter, Secrest & Emery LLP

(57) ABSTRACT

The present invention relates to a controller (11), a cabin pressure control system (10) and a method for controlling pressure in a cabin (30), especially an aircraft cabin. In accordance with the invention the controller (11) comprises a channel (15, 16) and a pressure differential safety function (22). The channel (15; 16) calculates a first output signal (40) for actuating an overflow valve (17) in a closed loop control based on the pressure differential between the cabin (30) and the atmosphere and additional critical parameters. The safety function (22) calculates a second output signal (41) based only on the pressure differential. The two output signals (40, 41) are compared, and the second output signal (41) is selected, if said first output signal (40) is found inaccurate. The safety function (22) assures operation of the outflow valve (17) even it the channel (15; 16) is out of function. Accordingly, the number of additional safety valves (18) may be reduced so that the weight of the system (10) is minimized. A manual control panel (26) is provided for backup.

32 Claims, 2 Drawing Sheets

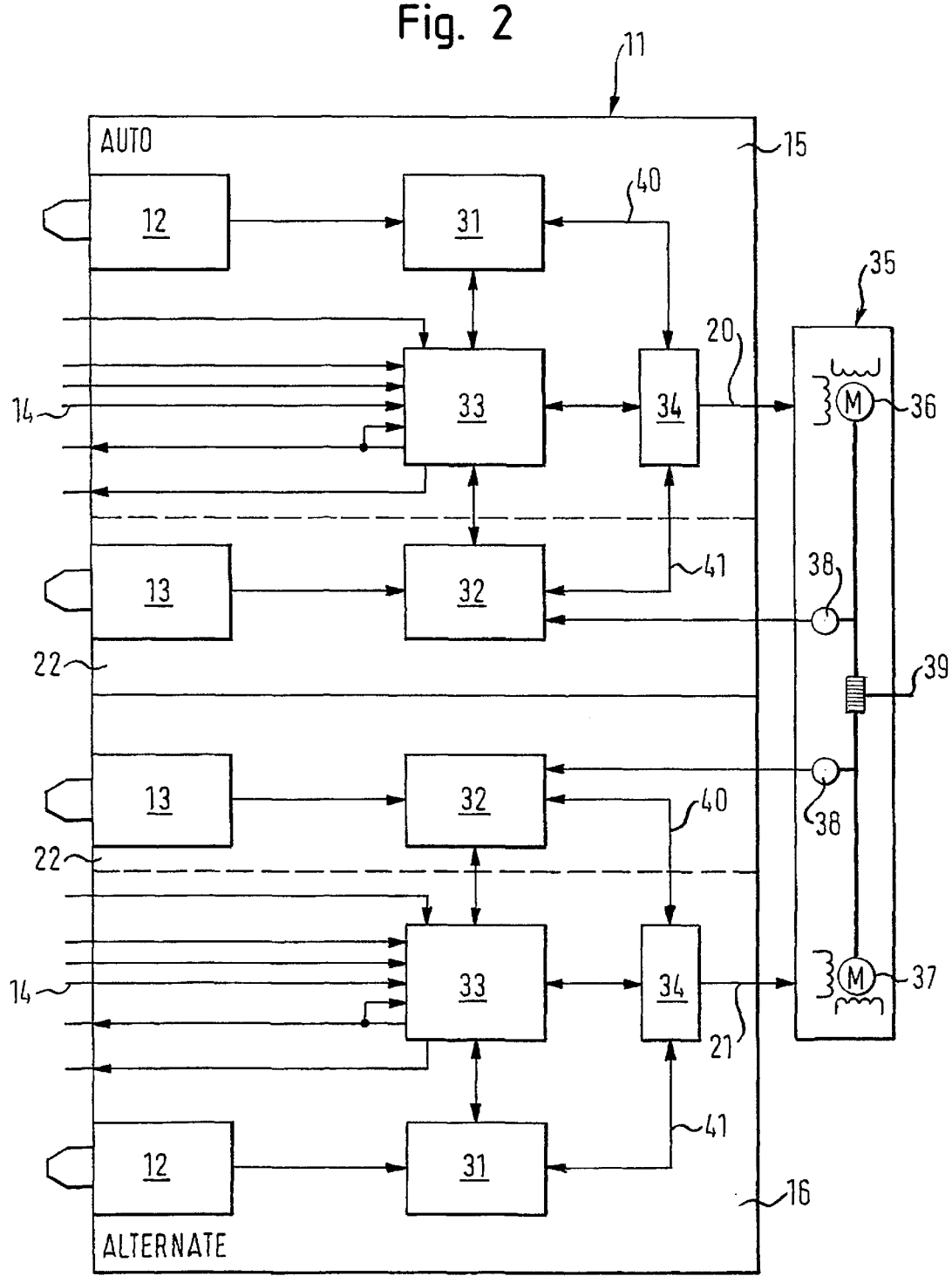

CONTROLLER, CABIN PRESSURE CONTROL SYSTEM AND METHOD OF CONTROLLING CABIN PRESSURE

The present invention relates to a controller for a cabin pressure control system for controlling actual pressure inside a cabin, preferably an aircraft cabin, comprising said controller being connected to a first sensor for measuring actual cabin pressure, an input unit for receiving information about atmosphere pressure or for receiving information about a pressure differential between actual cabin pressure and atmosphere pressure and information about additional critical parameters, a channel with a control for calculating an output signal based on the measured actual cabin pressure and the information received by the input unit.

Additionally, the present invention relates to a cabin pressure control system, especially for use in an aircraft, comprising a first pressure sensor for measuring the actual pressure inside the cabin, a controller with an input unit for receiving information about pressure of an atmosphere or for receiving information about a pressure differential between actual cabin pressure and atmosphere pressure and information about additional critical parameters, said controller comprising a channel for calculating a control cabin pressure based on the pressure differential between the cabin pressure and the atmosphere pressure and additional critical parameters and for generating an associated channel output signal in order to keep the actual cabin pressure near the control cabin pressure in a closed loop control, at least one outflow valve with an associated actuator actuatable by an output signal from said controller.

In yet another aspect, the present invention is directed to a method of controlling the actual pressure inside a cabin, especially in an aircraft cabin, comprising the steps of measuring the actual pressure inside said cabin, measuring the actual pressure in a surrounding atmosphere, calculating the pressure differential between said actual pressure and said atmosphere pressure, or, as alternative, measuring the pressure differential between said actual pressure and an atmosphere pressure, calculating a control cabin pressure based on the pressure differential between the cabin pressure and the atmosphere pressure and additional critical parameters, and generating a first output signal depending on the calculated control pressure in order to keep the actual cabin pressure near the control cabin pressure in a closed loop control.

The pressure differential between the actual cabin pressure and atmosphere pressure may be calculated by measuring both pressures and subtracting them from each other. Alternatively, said pressure differential may be measured directly by a suitable sensor. It is of course possible to use information from other aircraft systems, too. The pressure differential is referred to as positive if cabin pressure is higher than atmosphere pressure and as negative if otherwise.

A controller, a cabin pressure control system and a method of controlling the actual pressure inside a cabin are known from EP 0 625 463 B1, issued to the applicant of the present application. Said prior art document discloses a cabin pressure control system comprising a controller, one outflow valve and two safety valves. The controller calculates an output signal based on the pressure differential between the cabin and the atmosphere and additional critical parameters like final cruise flight level. The outflow valve is actuated in order to keep the actual cabin pressure near a predetermined control cabin pressure. The known system provides a closed loop control.

The system must fulfill two requirements. First, the pressure differential must not exceed a certain threshold because otherwise the aircraft fuselage may be damaged or destroyed. Second, the operator usually sets a certain pressure rate of change which must be maintained. Huge change rates in cabin pressure are harmful for the crew and the passengers and therefore not acceptable.

In case of malfunction of the outflow valve or the controller, the pressure differential between the cabin pressure and the atmosphere pressure may exceed a predetermined threshold. In case of a positive pressure differential the safety valves open mechanically based on said pressure differential. Said opening prevents damage or destruction of the cabin due to the pressure differential. In order to compensate a negative pressure differential, the known system additionally provides a negative relief valve allowing entry of air in the cabin.

The known cabin pressure control system is reliable. However, it requires the use of one outflow valve and two safety valves to prevent overpressure, leading to an increased weight which is most undesirable in aircrafts. Two independent overpressure relief valves are required by aviation regulations.

Accordingly, it is an object of the present invention to provide a controller and a cabin pressure control system allowing effective pressure control and preventing undue high cabin pressure with reduced weight. It is a further object of the present invention to provide a method of controlling the actual pressure inside a cabin, especially an aircraft cabin which is effective and reliable.

To achieve said objects, the invention proposes a controller of the above mentioned kind which characterized in that said controller comprises a pressure differential safety function calculating an output signal based alone on the pressure differential between actual cabin pressure and atmosphere pressure, said safety function being connectable to a second sensor for measuring actual cabin pressure, and in that said safety function comprises a control for comparing the two output signals and selecting the output signal generated by the safety function if the output signal from said channel control is found inaccurate.

The cabin pressure control system is characterized by the features that it that comprises a second sensor for measuring actual cabin pressure, that said controller comprises a pressure differential safety function calculating an output signal depending only on the pressure differential between actual cabin pressure and atmosphere pressure, which is connected to said second sensor, and that said safety function comprises a control for comparing the two output signals and selecting the output signal generated by the safety function if the output signal from said channel control is found inaccurate.

The method in accordance with the invention comprises the additional steps of generating a second output signal depending only on the pressure differential between the actual cabin pressure and atmosphere pressure, said pressure differential being obtained independent from the pressure differential for generating said first output signal, and comparing said two output signals and selecting the second output signal if said first output signal is found inaccurate.

The invention provides a pressure differential safety function which controls the output signal of the channel. If the channel output signal is found inaccurate, the output signal of the safety function is used. The channel output signal is deemed inaccurate if it would cause a pressure differential above a certain predetermined threshold or a too large rate of change in cabin pressure. The input information for the safety function is retrieved independent from the input information for the channel, using different sensors. Malfunction in a channel sensor will have no results on the safety function output signal The channel requires relatively sophisticated components and software, while the safety function may be implemented using simple components without software. Therefore, the safety function is much more reliable and fail-safe than the channel and provides the necessary operation of the outflow valve.

The invention allows elimination of one of the previously used safety valves. It is now possible to control the actual cabin pressure with one safety valve less than with the known system. The aviaton regulatory requirement of two independent overpressure relief valves is fulfilled by adding the safety function to the channel controlling the outflow valve. Accordingly, the weight of the system in accordance with the invention may be considerably reduced. The method in accordance with the invention allows for reliable and effective control of the actual cabin pressure.

Further advantageous features and embodiments of the invention read from the dependent claims.

Preferably, said controller comprises two channels operating independently from each other, each channel being provided with a pressure differential safety function. In case of malfunction of the first channel, its safety function and the second channel may be used as backup.

To advantage said actuator comprises two motors operable independent from each other, the first motor being actuatable by said first channel and the second motor being actuatable by said second channel. Additionally, both channels are preferably connected to different sensors. Said embodiment provides function of the two channels completely independent from each other. Only the gear and axle to the outflow valve are common to both channels. However, a mechanical fault may nearly be eliminated by proper testing and prototyping. Therefore, the system and method in accordance with the invention are highly reliable.

In accordance with an advantageous embodiment of the invention, the cabin pressure control system further comprises at least one safety valve operating pneumatically depending on the pressure differential between the inside of said cabin and the surrounding atmosphere. Said safety valve operates completely independent from the controller and the output valve. It does not require external energy and is actuated only based on the pressure differential. Said safety valve ensures that the pressure differential does not exceed a predetermined threshold and avoids damage or destruction of the cabin due to increased actual cabin pressure.

The motors of said actuator are, however, preferably operated electrically. Accordingly, the position of the outflow valve may be controlled with high precision and the actual cabin pressure may be kept near the calculated control cabin pressure.

Preferably, the cabin pressure control system is provided with an additional manual control of the position of said outflow valve. Said manual control allows override of the automatic functions of the controller by an operator in order to compensate any possible malfunction.

Preferably, the system comprises at least one safety valve operating mechanically depending on the pressure differential between the inside of said cabin and the surrounding atmosphere. Said safety valve ensures proper pressure differential even if the controller is completely malfunctional.

According to another preferred embodiment, the cabin pressure control system comprises at least one additional negative relief valve. Said negative relief valve opens as soon as the actual cabin pressure drops below atmosphere pressure. Cabin pressure below atmosphere pressure which is not required for structural integrity of the cabin and may lead to injuries of persons or animals inside the cabin is avoided.

To advantage the controller is arranged separately from said outflow valve. Said arrangement allows simple construction and assembly of the outflow valve. Moreover, different outflow valves and controllers may be combined, leading to high flexibility and a modular design.

Turning to the method in accordance with the invention, the additional critical parameters preferably are final cruise flight level, the landing field elevation, engine power signals and/or landing gear information. The position of the outflow valve may therefore be selected taking in account all possible relevant information.

To advantage, miscalculations of said channel output signal are stored in a non-volatile memory. Said storage permits retrieval of all miscalculations at a later date for proper evaluation.

The invention will now be detailed by way of example embodiments shown in the drawings, in which:

FIG. 2 shows a more detailed schematic view of a controller in a second embodiment of the present invention.

Figure 1:
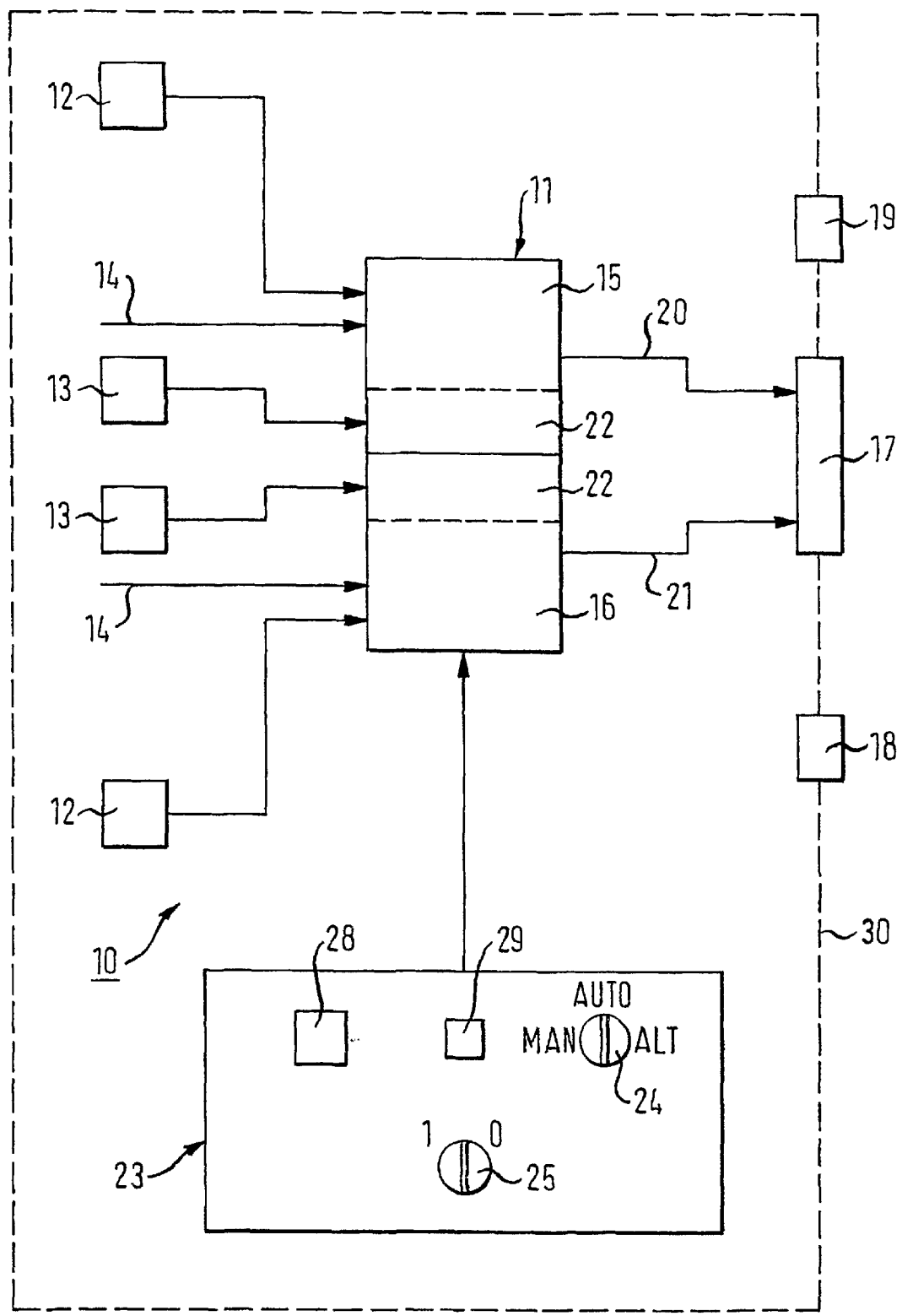
FIG. 1 shows a schematic view of a first embodiment of a cabin control system in accordance with the present invention.

FIG. 1 shows a cabin pressure control system 10 comprising a controller 11 with two channels 15, 16. Each channel 15, 16 is provided with a pressure differential function 22. Cabin pressure is measured by sensors 12, 13, the sensors 12 providing information for the channels 15, 16 and the sensors 13 providing information for the pressure differential functions 22. Malfunction of one sensor 12 will leave the other sensors unharmed so that the system 10 is redundant. Further information like atmosphere pressure, pressure differential, final cruise flight level, landing field elevation, engine power gears and/or landing gear information and the like is transmitted to controller 11 as indicated with arrow 14. The system 10 additionally comprises an outflow valve 17, a safety valve 18 and a negative relief valve 19. The cabin 30 itself is shown in dashed lines. The controller 11 is positioned near the outflow valve 17, but separated from it.

Safety valve 18 opens if the cabin pressure exceeds the atmosphere pressure by a certain amount in order to ensure integrity of the cabin 30. A possible threshold may be around 500 to 600 mbar. Additionally, the safety valve 18 opens if the actual pressure differential is 4 mbar above the control pressure differential. Contrarily, negative relief valve 19 opens only if the cabin pressure is below atmosphere pressure, e.g. more than 15 mbar. Both valves 18, 19 operate independently from each other and controller 11 and outflow valve 17. They do not require an external power source and operate alone on the pressure differential between the cabin 30 and the atmosphere.

The system 10 additionally comprises a manual control panel 23. A control 24 allows to manually switch the system 10 between channel 15 (AUTO), channel 16 (ALT) and manual operation (MAN). In manual operation mode, switch 25 allows to manually change the position of the outflow valve 17, opening indicated with "1" and closing with "0". Said panel 23 further comprises a DUMP button 28 for rapid depressurization of cabin 30. An indicator 29 is provided to alert an operator in case of emergency or malfunction.

FIG. 2 shows the controller 11 with the channels 15, 16 more in detail. As both channels 15, 16 are identical, only channel 15 will be described in detail, the description being valid for channel 16, too.

Channel 15 comprises a control 31, an input/output device 33 and a motor drive 34. Information is fed to and returned from device 33 to other aircraft systems. Additionally, channel 15 is connected to sensor 12 for measuring cabin pressure. Shown next to channel 15 is the pressure differential safety function 22 comprising a control 32 which is connected to pressure sensor 13. It should be noted that different sensors 12, 13 are provided.

Channel 15 calculates a first output signal 40 based on the information received by control 31. Said output signal 40 is transferred to motor drive 34. At the same time, safety function 22 calculates a second output signal based only in the pressure differential. The two output signals 40, 41 are compared. If output signal 40 is accurate, it is sent to actuator 35. If output signal 40 is inaccurate, output signal 41 from the safety function 22 is sent to motor drive 34 and overwrites the channel output signal 40. Next, the motor drive 34 sends the chosen signal 20 to associated motor 36 of actuator 35.

Output signal 40 is deemed inaccurate if it would cause a an undue change in pressure differential or if it would lead to a pressure differential higher than a predetermined threshold. In other words, the two criteria set forth in the beginning of the specification regarding the pressure differential must be met. It is also possible to regard output signal 40 as inaccurate if it deviates largely from safety function output signal 41.

The safety function 22 may be implemented with relatively simple components and with little or no software and, accordingly, is very reliable. Contrarily, channels 15, 16 require more sophisticated components and software and may therefore be prone to malfunction. In case of malfunction of channels 15, 16, safety function 22 is still operational and actuates outflow valve 17.

Signals from the motor drives 34 are transferred to associated motors 36, 37 of an actuator 35 for the outflow valve 17. Motor 36 is actuatable by the first channel 15, and motor 37 is actuatable by the second channel 16. Motors 36, 37 are operable independent from each other and require electrical energy as schematically shown. Both motors 36, 37 engage a common gear and turn a common axle 39 for controlling the position of the output valve 17. Speed and/or position of the motors 36, 37 is measured by potentiometers 38 and transferred back to the controls 32, the input/output units 33 and then back to a data bus (not shown). Depending on the actual conditions, the indicator 29 on the manual control panel 23 may flash of provide another indication of the current status of the controller 11.

The system 10 in accordance with the invention comprises a number of safety precautions. First, both channels 15, 16 are, if possible, in stand-by if manual control is selected. In manual operation, the pressure differential is limited in order to avoid cabin damage.

The following additional safety features and warnings are provided:

a) Cabin Altitude Limit

Two pressure sensors 12 measure cabin pressure in each channel 15, 16. If the cabin altitude exceeds the limit of 4,419.6±15.24 m (14,500±50 ft) a first logic circuit closes the outflow valve 17 automatically. This will be done independent from the pressure control logic of controller 11. Additionally, depending on the aircraft operation, a second logic circuit will limit the cabin altitude to 3,779.52±15.24 m (12,400±50 ft). Both logic circuits are not operational in manual mode.

b) Negative Relief

Whenever the atmosphere pressure is higher than the cabin pressure, e.g. after a fast aircraft descent, the controller 11 will immediately open the outflow valve 17, thus allowing outside air to enter the cabin 11 in order to maintain a low pressure differential. Additionally, the negative relief valve 19 limits the negative pressure differential in case the outflow valve 17 is not operational.

c) Positive Relief

Whenever the pressure differential exceeds the nominal pressure differential by 4 mbar, the controller 11 opens the outflow valve 17 to limit the pressure differential. Said function is available in both automatic and alternate mode and in manual mode. Additionally, the independent safety valve 18 limits the positive pressure differential in case the outflow valve 17 is not operational.

For indication of a failure of the controller 11 or a critical aircraft situation, the system 10 in accordance with the invention provides the following warnings:

a) Auto Fault Indication

If control 32 of controller 11 detects a major failure of the first channel 15, an appropriate indicator on the manual control panel 23 will be illuminated to cause the operator to switch to alternate or manual mode. Switching to alternate mode may be done automatically if no operator input has been received for a certain time.

b) Alternate Fault Indication

If controller 32 of controller 11 detects a major failure of the second channel 16, an appropriate indicator on the manual control panel 23 will be illuminated to cause the operator to switch to auto or manual mode. Switching to auto mode may be done automatically if no operator input has been received for a certain time. If an alternate fault occurs after an auto fault, a different indicator may be illuminated.

c) Excessive Cabin Altitude Warning

As per FAR 25.841 required, both channels 15, 16 will provide a high cabin altitude warning a 3,048 m (10,000 ft) cabin altitude, independent of the selected mode. In case automatic mode is selected, the controller 11 will provide additional information if the aircraft operation requires a cabin altitude of over 3,048 m (10,000 ft). The system 10 shall overwrite the warning up to the altitude specified by controller 11. However, the 3,048 m (10,000 ft) warning will always be shown for a cabin altitude of 4,267.2 m (14,000 ft) or higher.

The controller 11, the system 10 and the method of the present invention allow to convert the outflow valve 17 to a safety valve 18 if one of the channels 15, 16 of the controller 11 is damaged or malfunctioning. Accordingly, for each outflow valve 17 used and controlled in accordance with the invention, one safety valve 18 can be eliminated. Therefore, the present system 10 allows for a significant reduction in weight while providing high redundance and reliability.

What is claimed is:

1. A controller for a cabin pressure control system for controlling actual pressure inside a cabin comprising:

said controller being connected to a first sensor for measuring actual cabin pressure, an input unit for receiving information about atmosphere pressure or for receiving information about a pressure differential between actual cabin pressure and atmosphere pressure and information about additional critical parameters, a channel with a control for calculating an output signal based on the measured actual cabin pressure and the information received by the input unit, characterized in that said controller comprises a pressure differential safety function calculating an output signal based alone on the pressure differential between actual cabin pressure and atmosphere pressure, said safety function being connectable to a second sensor for measuring actual cabin pressure, and in that said safety function comprises a control for comparing the two output signals and selecting the output signal generated by the safety function if the output signal from said channel control is found inaccurate.

2. The controller according to claim 1, characterized in that said controller comprises two channels operating independently from each other, each channel being provided with a pressure differential safety function.

3. A cabin pressure control system comprising:

a first pressure sensor for measuring the actual pressure inside the cabin, a controller with an input unit for receiving information about pressure of an atmosphere or for receiving information about a pressure differential between actual cabin pressure and atmosphere pressure and information about additional critical parameters, said controller comprising a channel for calculating a control cabin pressure based on the pressure differential between the cabin pressure and the atmosphere pressure and additional critical parameters and for generating an associated channel output signal in order to keep the actual cabin pressure near the control cabin pressure in a closed loop control, at least one outflow valve with an associated actuator actuatable by an output signal from said controller, characterized in that said cabin pressure control system comprises a second sensor for measuring actual cabin pressure, in that said controller comprises a pressure differential safety function calculating an output signal depending only on the pressure differential between actual cabin pressure and atmosphere pressure, which is connected to said second sensor, and in that said safety function comprises a control for comparing the two output signals and selecting the output signal generated by the safety function if the output signal from said channel control is found inaccurate.

4. The cabin pressure control system according to claim 3, characterized in that said controller comprises two channels operating independently from each other, wherein each channel is provided with a pressure differential safety function and a sensor for measuring actual cabin pressure.

5. The cabin pressure control system according to claim 3, characterized in that it further comprises a manual control panel for manually controlling the position of said outflow valve.

6. The cabin pressure control system according to claim 3, further comprising at least one safety valve operating pneumatically depending on the pressure differential between the inside of said cabin and the surrounding atmosphere.

7. The cabin pressure control system according to claim 3, characterized by at least one negative relief valve.

8. The cabin pressure control system according to claim 3, characterized in that said controller is arranged separately from said outflow valve.

9. The cabin pressure control system according to claim 4, characterized in that said actuator comprises two motors operable independent from each other, the first motor being actuatable by said first channel and the second motor being actuatable by said second channel.

10. The cabin pressure control system according to claim 4, characterized in that it further comprises a manual control panel for manually controlling the position of said outflow valve.

11. The cabin pressure control system according to claim 4, further comprising at least one safety valve operating pneumatically depending on the pressure differential between the inside of said cabin and the surrounding atmosphere.

12. The cabin pressure control system according to claim 4, characterized by at least one negative relief valve.

13. The cabin pressure control system according to claim 4, characterized in that said controller is arranged separately from said outflow valve.

14. The cabin pressure control system according to claim 9, characterized in that the motors of said actuator are electrically operated.

15. The cabin pressure control system according to claim 9, characterized in that it further comprises a manual control panel for manually controlling the position of said outflow valve.

16. The cabin pressure control system according to claim 9, further comprising at least one safety valve operating pneumatically depending on the pressure differential between the inside of said cabin and the surrounding atmosphere.

17. The cabin pressure control system according to claim 9, characterized by at least one negative relief valve.

18. The cabin pressure control system according to claim 9, characterized in that said controller is arranged separately from said outflow valve.

19. The cabin pressure control system according to claim 14, characterized in that it further comprises a manual control panel for manually controlling the position of said outflow valve.

20. The cabin pressure control system according to claim 14, further comprising at least one safety valve operating pneumatically depending on the pressure differential between the inside of said cabin and the surrounding atmosphere.

21. The cabin pressure control system according to claim 14, characterized by at least one negative relief valve.

22. The cabin pressure control system according to claim 14, characterized in that said controller is arranged separately from said outflow valve.

23. The cabin pressure control system according to claim 19, further comprising at least one safety valve operating pneumatically depending on the pressure differential between the inside of said cabin and the surrounding atmosphere.

24. The cabin pressure control system according to claim 19, characterized in that it further comprises a manual control panel for manually controlling the position of said outflow valve.

25. The cabin pressure control system according to claim 19, characterized by at least one negative relief valve.

26. The cabin pressure control system according to claim 19, characterized in that said controller is arranged separately from said outflow valve.

27. The cabin pressure control system according to claim 26, characterized in that it further comprises a manual control panel for manually controlling the position of said outflow valve.

28. The cabin pressure control system according to claim 26, characterized by at least one negative relief valve.

29. A method of controlling the actual pressure inside a cabin comprising the following steps:

measuring the actual pressure inside said cabin, measuring the actual pressure in a surrounding atmosphere, calculating the pressure differential between said actual pressure and said atmosphere pressure, or, as alternative, measuring the pressure differential between said actual pressure and an atmosphere pressure, calculating a control cabin pressure based on the pressure differential between the cabin pressure and the atmosphere pressure and additional critical parameters, and generating a first output signal depending on the calculated control pressure in order to keep the actual cabin pressure near the control cabin pressure in a closed loop control, characterized by the steps of generating a second output signal depending only on the pressure differential between the actual cabin pressure and atmosphere pressure, said pressure differential being obtained independent from the pressure differential for generating said first output signal, comparing said two output signals and selecting the second output signal if said first output signal is found inaccurate.

30. The method according to claim 29, characterized in that said additional critical parameters are final cruise flight level, the landing field elevation, engine power signals and/or landing gear information.

31. The method according to claim 30, characterized in that miscalculations of said first output signal are stored in a non-volatile memory.

32. The method according to claim 29, characterized in that miscalculations of said first output signal are stored in a non-volatile memory.

* * * * *